United States Patent [19]

Bodolai

[11] 4,110,939

[45] Sep. 5, 1978

[54] CUPROUS OXIDE CONTAINING RESIN BONDED ABRASIVE ARTICLE AND PROCESS FOR MANUFACTURING SAME

[75] Inventor: John J. Bodolai, Niagara Falls, Canada

[73] Assignee: The Carborundum Company, Niagara Falls, N.Y.

[21] Appl. No.: 805,768

[22] Filed: Jun. 13, 1977

[51] Int. Cl.² .............................................. C09K 3/14
[52] U.S. Cl. .................................... 51/298 R; 51/295
[58] Field of Search .......................... 51/295, 298, 309

[56] References Cited

U.S. PATENT DOCUMENTS

| | | | |
|---|---|---|---|
| 2,878,111 | 3/1959 | Daniels | 51/298 |
| 3,041,156 | 6/1962 | Rowse et al. | 51/298 |
| 3,098,730 | 7/1963 | Rowse | 51/298 |
| 3,518,068 | 6/1970 | Gillis | 51/298 |
| 3,664,819 | 5/1972 | Sioui et al. | 51/298 |
| 3,899,307 | 8/1975 | Thompson | 51/298 |

*Primary Examiner*—Donald J. Arnold
*Attorney, Agent, or Firm*—David E. Dougherty; Raymond W. Green; Michael L. Dunn

[57] ABSTRACT

A resin bonded abrasive article and the process for its manufacture which comprises blending a cuprous oxide with an abrasive and bonding resin, shaping the resulting blend and curing the resin to form a resin bonded abrasive article. The invention further comprises the same process wherein an organosilane is incorporated into the blend.

26 Claims, No Drawings

CUPROUS OXIDE CONTAINING RESIN BONDED ABRASIVE ARTICLE AND PROCESS FOR MANUFACTURING SAME

BACKGROUND OF THE INVENTION a. Field of the Invention

This invention relates to resin bonded abrasive articles and their method of manufacture and more particularly relates to resin bonded abrasive wheels.

b. History of the Prior Art

Resin bonded abrasive articles, particularly resin bonded abrasive grinding wheels, are well known in the art. Such wheels are used for numerous applications including grinding, polishing and cutting. In operation, abrasive wheels are rotated at high speeds which makes it imperative that the wheels have sufficient physical strength and flexibility to withstand the high centrifugal forces generated during rotation and to withstand outside forces applied to the wheels during the grinding, polishing or cutting operation.

In the prior art, very high speed wheels; i.e. those made for use at speeds in excess of 3000 rpm, still occasionally break when they are being used which sometimes causes pieces of the abrasive wheel to fly off the wheel due to centrifugal force.

It is therefore clear that increasing the physical strength of abrasive wheels to further reduce breaking or cracking of the wheels is highly desirable.

Many attempts have been made to increase the strength of abrasive wheels with limited success. Such attempts have included using improved and modified resins and as disclosed in U.S. Pat. Nos. 3,481,723 and 3,528,790 have included the use of modified abrasive grain to achieve improved strength.

The use of fillers blended with the resin have also been found to increase wheel strength. Additionally, such fillers as disclosed in U.S. Pat. No. 2,371,700, comprised certain metals or metal compounds of certain metals of groups IV, V, VI, VII, and VIII of the fourth series of the periodic table of elements. An example of such a compound is chromium oxide. Additionally, as disclosed in U.S. Pat. No. 2,070,734, ferric oxide has been known as a suitable filler. Other suitable fillers disclosed in U.S. Pat. No. 3,087,803, include chromium oxide, zirconia and titania. Iron sulfide is disclosed as a suitable filler in U.S. Pat. No. 3,632,320 and trimanganese tetroxide and ferric oxide have been disclosed as suitable fillers in U.S. Pat. No. 3,960,517.

It has also been recognized in the prior art that certain other metal compounds will act as suitable fillers. U.S. Pat. No. 3,820,290 for example, discloses that potassium fluoroborate, sodium fluoroaluminate, barium sulfate, iron sulfide and calcium oxide are satisfactory filler compositions. In addition to other filler compositions previously mentioned, U.S. Pat. No. 3,632,320 discloses that cryolite, fluorspar, zincblende, lead chloride and lead sulfide are suitable fillers. U.S. Pat. No. 3,087,803 discloses that silicon dioxide and aluminum oxide may comprise suitable filler compositions. Magnesium oxide is suggested as an appropriate filler composition in U.S. Pat. Nos. 2,294,239 and 3,208,836. Despite the numerous types of filler compositions tested and utilized in the prior art, such compositions even at the high percentage use level commonly used, do not impart as much strength to the bonded abrasive article, such as an abrasive wheel, as is desirable.

BRIEF DESCRIPTION OF THE INVENTION

In accordance with the invention there is provided an improved process for the manufacture of a resin bonded abrasive article manufactured by blending a curable liquid resin with an abrasive, shaping the resulting blend and curing the resin to form a resin bonded abrasive article. The improvement in the process comprises incorporating from about 0.2 to about 5 weight percent of particulate cuprous oxide into the blend prior to shaping the blend. The invention further comprises the resin bonded abrasive article manufactured in accordance with the process which article is a resin bonded abrasive article containing from about 0.2 to about 5 weight percent of particulate cuprous oxide.

DETAILED DESCRIPTION OF THE INVENTION

The resin bonded abrasive article manufactured in accordance with the invention is usually an abrasive grinding wheel which may be of any type such as a wheel for stock removal, polishing or cutoff applications. The resin bonded abrasive article may, however, be any abrasive article wherein the abrasive articles are bonded together with a resin. Other examples of such resin bonded abrasive articles include sharpening and honing stones, mounted points and segments.

The abrasive utilized in the abrasive article may be any abrasive grit or particle known to those skilled in the art including alumina, silica, zirconia, diamond, garnet, various fused and sintered combinations of alumina, zirconia and silica, and silicon carbide. The abrasive in the resin bonded abrasive article generally constitutes from about 79.8 to about 95.8 weight percent of the article. The average particle size of the abrasive is from about 90 to about 2500 microns and usually from about 700 to about 1000 microns.

The abrasive is held together or bonded by a resin which is cured after it is blended with the abrasive. The resin may be a curable liquid or solid resin or a combination of both liquid and solid resins.

The curable resin is any resin which can be cured to form a solid resin having sufficient strength and adhesion to securely bond the abrasive particles. Examples of such resins are phenolic resins and polyester resins. The most desirable resins are phenolic type resins including resol resins which are heat curable and novolac resins which require a curing agent such as hexamethylenetetramine or paraformaldehyde.

The preferred resin is a combination of a heat curable liquid resol and a solid novolac resin.

The curable liquid resin should not have a high molecular weight prior to curing to permit the resin to be blended with the abrasive particles. The curable liquid resin prior to curing should therefore have a viscosity of from between about 0.8 to a maximum of about 10,000 poise and desirably between about 10 and about 1000 poise. The most desirable liquid phenolic resin is a low viscosity liquid phenolic resin with a slow rate of cure having a viscosity at 25° C of between about 325 and 450 centipoise and a gell time of about 35 minutes at 121° C. Suitable liquid resins are commercially available from Varcum Chemical Division of Reichhold Chemical Inc. under the name of Varcum 8121 and from Georgia Pacific Corporation under the name of GP5080.

The most desirable powdered phenolic resin is a medium flow solid novolac resin containing from about 2 to about 15 weight percent, based upon weight of novolac resin, of hexamethylenetetramine. The resin may be any phenolic type novolac resin including those made from phenol and cresol. The most desirable powdered resin has a flow in millimeters of between about 26 and 34. The flow is determined by heating a 10mm diameter by 6mm thick pellet of the resin at 125° ± 1° C for three minutes on a glass plate, tilting the plate to 65° from the horizontal and continuing to heat at 125° C ± 1° C for twenty minutes, cooling the plate in the horizontal position and measuring the flow distance in millimeters. The most desirable resin also has an apparent density of about 0.33 grams per cc and contains from about 7.2 to about 7.7 percent hexamethylenetetramine. The melting point of the uncured resin is from about 90 to about 97° C. Suitable solid resins are commercially available from the Carborundum Company under the name N2, from Ashland Chemical Division of Ashland Corporation under the name Arophene 875, from Varcum Chemical Co., Division of Reichhold Chemicals, Inc. under the name V7608 and from Borden Chemical Company, under the name Ad5991.

Desirably a wetting or dispersing agent is blended with the abrasive at the time of or prior to the blending of the abrasive with the liquid resin. Any effective agent known to those skilled in the art may be used. Examples of effective wetting agents are a liquid mixture of about 75 weight percent furfural and 25 weight percent cresol, colloidal silica and silanes. Wetting or dispersing agents may be used along or in combination. Particularly effective dispersing agents are amine modified organosilanes. Such organosilanes preferably have the structural formula:

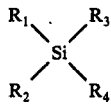

wherein the $R_1$, $R_2$, $R_3$ and $R_4$ radicals are independently lower alkyl, lower alkoxy or amino lower alkyl provided that at least one of the radicals is lower alkoxy and at least one of the radicals is amino lower alkyl.

Lower alkyl as used herein means an alkyl radical containing from 1 to 4 carbon atoms inclusive. Examples of lower alkyl radicals are methyl, alkyl, propyl, isopropyl, butyl, isobutyl and tert-butyl.

Lower alkoxy used herein means an alkoxy containing from 1 to 4 carbon atoms inclusive. Examples of such lower alkoxy radicals are methoxy, ethoxy, propoxy and butoxy.

Amino lower alkyl as used herein means an amine radical containing from 1 to 5 carbon atoms inclusive. Examples of such radicals are amino propyl, dimethyl amino propyl, amino ethyl and methyl amino ethyl.

A particularly desirable silane is a lower alkylamine modified triethoxysilane.

Suitable silanes may be commercially obtained from Union Carbide Silicone Division under the name A1100 Silane and from General Electric Company Silicones Products Division under the name SC-3901.

Desirably from about 0.05 to about 2 weight percent of amine modified organosilane is incorporated into the blend even when other additional dispersing or wetting agents are present. From about 0.05 to about 3 weight percent of such other agents are desirably also present, e.g. from about 0.05 to about 3 weight percent of colloidal silica dispersion (40 percent dispersion of colloidal silica in water)

In addition to abrasive, resin and wetting or dispersing agents, fillers such as fluorspar may be added and are desirably present in an amount of from about 5 to about 25 weight percent of the total blend.

The resin and other components of the composition are blended with the abrasive particles by any suitable mixing apparatus known to those skilled in the art. Examples of such suitable mixing apparatus include the Lancaster type mixer having a containing drum which rotates in a direction opposite the rotation of mixing paddles, the high speed propeller type mixer, and the ball mill. After blending, the dispersion of the abrasive particles, resin cuprous oxide ($CU_2O$), and other components should be uniform.

Simultaneously with the blending of the abrasive particles with the other components of the composition or following the blending of the other components, particulate cuprous oxide is incorporated and blended with the composition. Desirably, the cuprous oxide has an average particle size of less than 20 microns, preferably less than 6 microns and from about 0.2 to about 10 percent and preferably from about 0.5 to about 5 percent cuprous oxide is added by weight of the blend.

The cuprous oxide may be added as pure cuprous oxide or may be blended with another component. Preblends of cuprous oxide with silicon carbide are particularly desirable, e.g. 70 weight percent $Cu_2O$ blended with SiC having a particle size range of 5 to 30 and an average particle size of 15.

It has been found that forming a preblend of cuprous oxide, or the blend of cuprous oxide with silicon carbide, with the filler, if any, is present prior to incorporating with the abrasive resin blend, results in a more complete dispersion of the cuprous oxide into the composition.

After blending, the blended composition is shaped. The shaping is usually accomplished by introducing the blend into a mold and subjecting the blend in the mold to a pressure of about 3 to about 300 kilograms per square centimeter at a temperature of from about 10 to about 100° C and preferably at about 25° C for from about 5 seconds to about 10 minutes.

After shaping the article, which desirably contains from about 5 to about 20 percent curable liquid resin, from about 79.8 to about 94.8 weight percent abrasive and from about 0.2 to about 10 percent cuprous oxide is then cured. The curing usually occurs at a temperature of from about 100° C to about 225° C for from about 1 to about 24 hours.

After curing the resulting resin bonded abrasive article is found to have excellent strength as compared with similar articles manufactured in the prior art.

The following examples are for the purpose of illustrating, not limiting, the process and article of the invention.

EXAMPLE I 3,700 grams of 24 grit aluminum oxide abrasive is introduced into a Lancaster type mixer having a rotating tub and paddles which rotate in a direction opposite the direction of rotation of the tub. The mixer is then activated and to the alumina abrasive by step wise addition are then added 5 cc of a wetting agent comprising 75 percent furfural and 25 percent cresol, 185 grams of Varcum 8121 liquid phenolic resin, 465 grams of V7608 powdered phenolic resin having medium flow and 650 grams of fluorspar having an average particle size of 200 mesh.

The above ingredients are blended in a mill until the blend is uniform and about 500 grams of the resulting blend is introduced with two layers of fiber glass reinforcing cloth, into an abrasive wheel mold having inside mold dimensions of 6 inches by ¼ inches thick with a 1 inch diameter central hole. The material in the mold is then subjected with a pressure of 3,000 psig for 10 seconds. The resulting formed wheel is then dusted with zinc stearate powder and cured for 38 hours using the following sequence:

| Room Temperature to 85° | 8 hrs. |
|---|---|
| Hold at 105° C | 6 hrs. |
| 105° C to 180° C | 10 hrs. |
| Hold at 180° C | 9 hrs. |
| 180° C to 95° C | 3 hrs. |

The wheel is then unloaded from curing oven when the temperature is about 52° C or less. The resulting abrasive wheel is a bonded abrasive wheel manufactured in accordance with known prior art procedures.

EXAMPLE II

Example I is repeated except that the 5 cc of the furfural-cresol liquid is eliminated and 5 cc of 40 percent suspension colloidal silica is added. The resulting wheel is found to have a higher burst speed, i.e. greater resistance to breaking under centrifugal force, than the grinding wheel manufactured in accordance with Example I.

EXAMPLE III

Example I is repeated except 5 cc of 1100 aminofunctionalorganosilane is incorporated into the blend. The resulting abrasive wheel is found to have a higher burst speed than the wheel manufactured in accordance with Example I.

EXAMPLE IV

Example II is repeated except 5 cc of A1100 amino-substitutedorganosilane is incorporated into the blend. The resulting abrasive wheel is found to have a higher burst speed than the wheels manufactured in accordance with Examples I, II and III.

EXAMPLE V

Example I is repeated except that 50 grams of a uniform mixture of 70 percent curpous oxide ($Cu_2O$) and 30 percent silicon carbide (SiC) having an average particle size of 15$\mu$ is preblended with the powdered phenolic resin and the fluorspar and the preblend is then added to the aluminum oxide blend. The resulting wheel is found to have an improved burst speed over the burst speed of the wheel prepared in accordance with Example I.

EXAMPLE VI

Example III is repeated except that 50 grams of the $Cu_2O$—SiC mix is preblended with the powdered phenolic resin and fluorspar. The resulting preblend is then incorporated into the aluminum oxide blend. The resulting wheel is found to have a burst speed which is superior to the burst speed of any of the wheels manufactured in accordance with Examples I through V.

EXAMPLE VII

Example IV is repeated except that 50 grams of the $Cu_2O$—SiC mix is preblended with the powdered phenolic resin and fluorspar and the preblend is then incorporated into the aluminum oxide blend. The resulting abrasive wheel has a burst speed which is higher than the burst speeds of any of the wheels manufactured in accordance with Examples I through V and which is essentially the same as the burst speed manufactured in accordance with Example VI.

EXAMPLE VIII

Example VII is repeated except that 50 grams of essentially pure cuprous oxide is substituted for the $Cu_2O$—SiC mix. The resulting wheel has a burst speed which is approximately the same as the burst speed of the wheel prepared in accordance with Example VII.

EXAMPLE IX

Six wheels are prepared in accordance with each of Examples I, II, IV and VII. Twelve samples having a dimension of approximately 1 inch by ¼ inch cross section are cut from three of the wheels prepared in accordance with each of the examples. The samples are then tested for tensile strength on an Instron apparatus. The remaining three wheels from each of the examples are tested for burst speed by mounting each of the wheels and turning them at increasingly higher speeds until a portion of the wheel flies free from the balance of the wheel. The tensile strength in kilograms and the burst speed in surface meters per minute (SMPM) are shown in Table I.

TABLE I

| | MEAN TENSILE STRENGTH | MEAN BURST SPEED |
|---|---|---|
| EXAMPLE I | 376 Kg | 6,615 |
| EXAMPLE II | 390 Kg | 6,770 |
| EXAMPLE IV | 430 Kg | 7,230 |
| EXAMPLE VII | 508 Kg | 7,645 |

Table I shows that the addition of cuprous oxide in a blend used in making the abrasive wheel particularly when used in conjunction with colloidal silica and organosilane substantially increases both tensile strength and burst speed of the resulting wheel.

What is claimed is:

1. In a process for the manufacture of a resin bonded abrasive article which comprises blending a phenolic resin with an abrasive, shaping the resulting blend and curing the resin to form a resin bonded abrasive article, the improvement which comprises incorporating from about 0.2 to about 5 weight percent of particulate curpous oxide into the blend prior to shaping.

2. The process of claim 1 wherein from about 0.05 to about 2 weight percent of amine modified organosilane is incorporated into the blend.

3. The process of claim 2 wherein said organosilane has the structural formula:

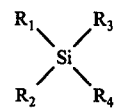

wherein the $R_1$, $R_2$, $R_3$ and $R_4$ radicals are independently lower alkyl, lower alkoxy or amino lower alkyl provided that at least one of said radicals is amino lower alkyl and at least one of said radicals is lower alkoxy.

4. The process of claim 3 wherein said amine modified organosilane is a lower alkyl amine modified tri-lower alkoxy silane.

5. The process of claim 3 wherein said amine modified organosilane is a lower alkyl amine modified triethoxy silane.

6. The process of claim 3 wherein the cuprous oxide has an average particle size of less than about 20 microns.

7. The process of claim 3 wherein said resin comprises a combination of a liquid resol phenolic resin and a solid novolac phenolic resin.

8. The process of claim 7 wherein the novolac resin is cured with hexamethylenetetramine.

9. The process of claim 8 wherein the resin comprises a cresol type phenolic resin.

10. The process of claim 8 wherein the cuprous oxide has an average particle size of less than about 20 microns.

11. The process of claim 10 wherein from about 0.05 to about 3 weight percent of colloidal silica is incorporated into the blend.

12. The process of claim 10 wherein the average particle size is less than about 6 microns.

13. The process of claim 1 wherein the abrasive is a particulate composition comprising aluminum oxide having an average particle size of between about 50 and about 2500 microns.

14. The process of claim 13 wherein the particle size is between about 700 and about 1000 microns.

15. The process of claim 13 wherein the abrasive is particulate aluminum oxide.

16. The process of claim 13 wherein the abrasive is a particulate composition comprising alumina fused with zirconia.

17. The process of claim 13 wherein the resin comprises a mixture of a solid novolac phenolic resin cured with from about 2 to about 15 percent by weight of resin of hexamethylenetetramine and a liquid resol phenolic resin which cures upon application of heat.

18. The process of claim 17 wherein from about 5 to about 20 weight percent of resin including hexamethylenetetramine is used.

19. The process of claim 17 wherein from about 94.8 to about 79.8 weight percent of abrasive is used.

20. The process of claim 19 wherein at least a portion of said resin prior to curing is a particulate solid.

21. The process of claim 19 wherein at least a portion of said resin prior to curing is a liquid having a viscosity of from about 0.80 to about 10,000 poise.

22. The process of claim 21 wherein at least a portion of said resin prior to curing has a viscosity of from about 10 to about 1000 poise.

23. The process of claim 19 wherein said blend is shaped in a mold at a temperature of from about 10° to about 100° C at a pressure of from about 3 to about 300 kilograms per square centimeter for from about 5 seconds to about 10 minutes.

24. The process of claim 19 wherein said shaped article is cured at from about 100° C to about 225° C for from about 1 to about 24 hours.

25. An abrasive article comprising an abrasive bonded with from about 5 to about 20 weight percent of a cured phenolic resin containing from about 0.2 to about 5 weight percent cuprous oxide.

26. The abrasive article of claim 25 wherein said cured resin further contains from about 0.05 to about 2 weight percent of an organosilane having the structural formula:

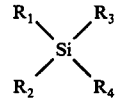

wherein the $R_1$, $R_2$, $R_3$ and $R_4$ radicals are independently lower alkyl, lower alkoxy or amino lower alkyl provided that at least one of said radicals is amino lower alkyl and at least one of said radicals is lower alkoxy.

* * * * *